No. 696,391. Patented Mar. 25, 1902.
J. C. COLE.
TIRE CONSTRUCTION.
(Application filed Sept. 23, 1901.)
(No Model.)

Witnesses Inventor
John C. Cole
by Chapin & Co.
Attorneys.

UNITED STATES PATENT OFFICE.

JOHN C. COLE, OF CHICOPEE FALLS, MASSACHUSETTS, ASSIGNOR OF ONE-HALF TO FISK RUBBER COMPANY, OF CHICOPEE FALLS, MASSACHUSETTS, A CORPORATION.

TIRE CONSTRUCTION.

SPECIFICATION forming part of Letters Patent No. 696,391, dated March 25, 1902.

Application filed September 23, 1901. Serial No. 76,220. (No model.)

*To all whom it may concern:*

Be it known that I, JOHN C. COLE, a citizen of the United States of America, residing at Chicopee Falls, in the county of Hampden and State of Massachusetts, have invented new and useful Improvements in Tire Constructions, of which the following is a specification.

This invention relates to vehicle-wheels and tire constructions, and particularly to the construction of pneumatic tires and to means for removably securing the same to the wheel, the object of the invention being to provide strong and simple devices for securing a tire to the rim of a wheel without gripping the body of the tire itself, whereby its elastic movements laterally would be restricted; and a further object of the invention lies in the provision of means whereby the tire may be also secured against circumferential and lateral movement and yet be readily removable; and the invention consists in the construction described in the following specification and summarized in the claims forming a part thereof.

Figure 1:
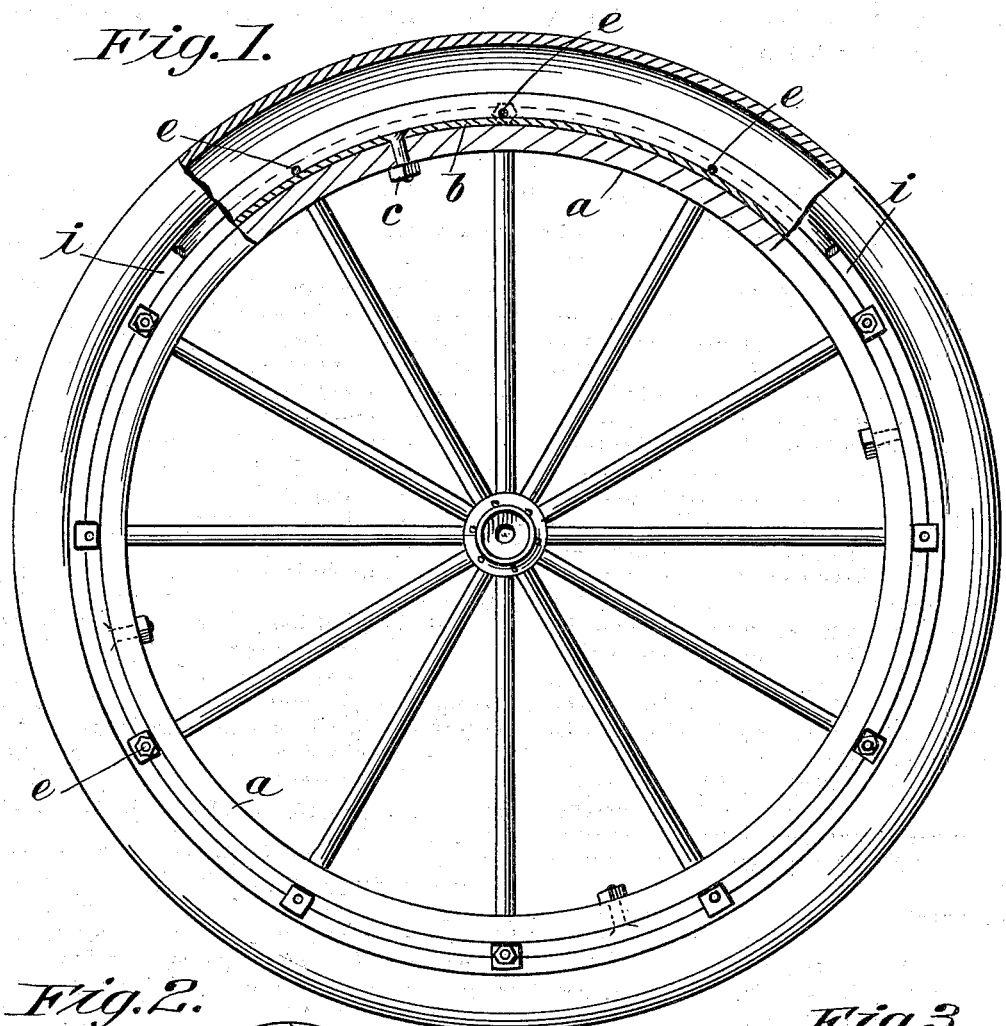
Figure 2:
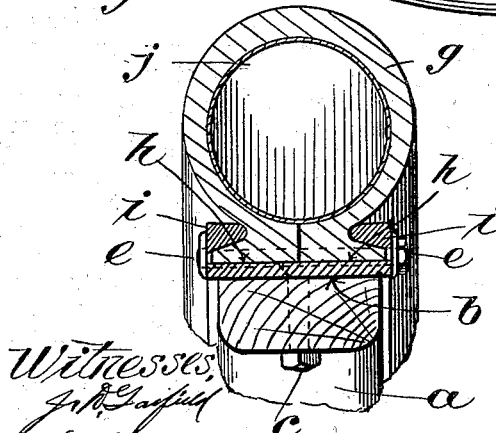
Figure 3:
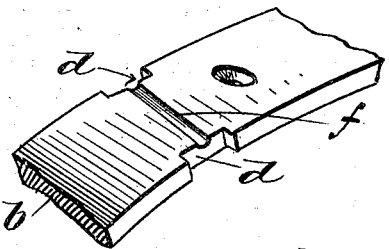

In the drawings forming part of this specification, Figure 1 is a side elevation of a wheel and tire constructed according to my invention, parts of the tire and wheel being in section. Fig. 2 is an enlarged transverse sectional view through the tire and felly. Fig. 3 is a perspective view of a part of the rim of a wheel.

Referring now to the drawings, $a$ represents the felly of a wheel; $b$, a metal rim which may be secured to the felly in the usual manner by being shrunk thereon and being secured by bolts $c$. As shown in Fig. 2, this rim preferably projects slightly beyond each side of the felly and has provided therein at proper intervals, as shown in Fig. 3, marginal recesses $d$, which are oppositely located in the edges of the rim. These recesses are located around the rim, where it is desired to place the bolts whereby the tire is secured to the rim. In the drawings these bolts are indicated by $e$, and extending transversely across the rim from one of these recesses to another there is a shallow groove $f$, in which the bolt $e$ lies when in operative position. The object of this groove $f$ and the engagement therewith of the bolt $e$ is to prevent the circumferential movement of the tire on the rim, or "creeping," as it is termed, and while the devices employed for securing the tire to the rim are deemed sufficient to prevent this creeping action the non-creeping of the tire is doubly assured by the engagement of the bolt $e$ with these shallow grooves $f$, as described, and with a similar groove in the base of the tire.

The tire shown in the drawings and indicated by $g$ illustrates a double-tube construction having a flat base $h$, preferably of somewhat less width than the rim $b$, on which it is seated. This base $h$ extends laterally of the tire beyond the point of its attachment to the latter, whereby an outwardly-extending flange is provided at each edge of the base, whose upper surfaces are upwardly inclined from the edges of the base, all as clearly shown in Fig. 2.

To secure the tire to the rim of the wheel, a separate ring $i$ is provided for each flange, the inner surface of which ring is beveled to fit the upwardly-inclined surface of the flanges of the base $h$. These rings $i$ are fitted, respectively, over each of the flanged portions of the base $h$, and the bolts $e$, fitting in suitable grooves in the base $h$ of the tire and in the grooves $f$ of the rim, engage these rings $i$, the head of the bolt bearing against one and the nut on the opposite end of the bolt bearing against the other, a suitable washer preferably being inserted between the nut and the edge of the ring. When the nut on this bolt is screwed up, the nut and washer on the one side and the head of the bolt on the other are adapted to enter the recesses $d$ in the edge of the rim, to the end that still another means other than the grooves $f$ may be provided for locking the tire to the rim against circumferential movement and to the end that the nut on the bolt in being screwed up may not bring up against the edge of the rim, whereby its further adjustment will be prevented.

The tire shown is divided longitudinally along its base line, to the end that an inner tube $j$ may be inserted therein; but the particular form of tire employed is immaterial, for it may be of the type shown, or it may be a single-tube tire, or it may be a solid rubber tire provided with the flanged base $h$. Either description of these tires would be provided with the same rings $i$ and bolts $e$ for securing them to the rim. As the nuts on the bolts $e$ are set up it is seen that the two rings $i$ will be drawn together, thus gripping the base of the tire transversely and at the same time forcing the inner beveled surfaces of the rings against the similarly-beveled upper surfaces of the flanges of the base, thereby at the same time binding the base on the rim. The inner edges of these rings $i$ are rounded, as shown, and the upper surfaces of the rings constitute two bearing-surfaces, against which the tire may seat itself for support when it is compressed by a load upon it.

From the above description it is seen that practically four-fifths of the circumferential wall of the tire is free to take any position imposed upon it by the condition of the load it bears, and yet by means of the devices described the tire may be so firmly gripped as to readily withstand any lateral or circumferential strains put upon it, and yet be readily removable.

Of course it will be understood that the invention may be applied to any form of a wheel and felly.

While it would be possible to apply a tire to the felly of a wheel not provided with a rim $b$ by locating the grooves $f$ and the recesses $d$ of said rim in the felly, such a construction would not be desirable, though it would clearly fall within the scope of this invention.

It will be observed that by means of the herein-described construction the base of the tire is clamped to the wheel along the entire circumference thereof and the tire locked to the wheel by positively interlocking means, whereby lateral or circumferential movement of the tire relative to the rim is prevented, and the tire is not dependent upon mere frictional contact with the rim for holding it in place on the latter.

Having thus described my invention, what I claim, and desire to secure by Letters Patent of the United States, is—

1. In combination with the felly of a wheel, a tire, a flat base thereon adapted to fit the periphery of the felly, a downwardly-beveled flange on each side of the base, a loose ring located on each flange, and devices for moving said rings one toward the other against said beveled surface, and means of engagement between said devices and the felly, substantially as described.

2. In combination with the felly of a wheel, a tire, a flat base thereon adapted to fit the periphery of the felly, a flange on each side of the base, the upper surface of which is downwardly inclined toward the edge of the base, a loose ring located on each flange and having a beveled under surface, and devices for moving said rings one toward the other, and means of engagement between said devices and the felly, substantially as described.

3. The combination with the felly of a wheel, of a flat metal rim secured to the felly, a tire, a base on the latter whereby it is clamped to said rim, and means for clamping said base to the rim consisting of a separate clamping-ring for each side of the base, suitable devices for drawing one of said rings toward the other, and constituting interlocking means between said tire and the wheel, substantially as described.

4. The combination with the felly of a wheel, of a flat metal rim secured thereon, a tire, a base on the latter, and means for securing said base to said tire against lateral and circumferential movements consisting of a ring located over each edge of said base, and bolts adapted to engage said rings whereby they may be drawn one toward the other, and means for interlocking said bolts and said rim, substantially as described.

5. The combination with a wheel, of a flat metal rim thereon, a tire having an outwardly-flaring flanged base fitting over said rim, rings having a greater diameter than said rim on either side of said base fitting over the outwardly-flaring portions thereof, and means for drawing said rings together whereby said base portions may be radially compressed against the rim.

6. In combination with the felly of a wheel, a tire, a flat base thereon adapted to fit the periphery of the felly, a flange on each side of the base, the upper surface of which is downwardly inclined toward the edge of the base, a loose ring located on each flange and devices for moving said rings one toward the other, and means of engagement between said devices and the felly, substantially as described.

7. The combination with a wheel, of a flat metal rim, a tire having an outwardly-flaring flanged base fitting over said rim, rings on either side of said base having a greater diameter than said rim and adapted to fit over said base portion of the tire, and means for drawing said rings together whereby said base portions of the tire may be compressed laterally, and radially against the rim.

8. The combination with a wheel, of a metal rim thereon, a tire, a base on the latter whereby it is clamped to the rim, and means for clamping the base to the rim consisting of a suitable abutment for the base on one side, and a loose ring having a greater diameter than said rim on the other side of said base, and means for forcing said ring over the edge of said base whereby the latter may be clamped between said ring and said rim.

JOHN C. COLE.

Witnesses:
WM. H. CHAPIN,
K. I. CLEMONS.